UNITED STATES PATENT OFFICE.

FRANZ FORCHER VON AINBACH, OF KNITTELFELD, AUSTRIA-HUNGARY.

MANUFACTURE OF ARTIFICIAL STONE.

SPECIFICATION forming part of Letters Patent No. 505,082, dated September 19, 1893.

Application filed August 26, 1892. Serial No. 444,204. (No specimens.) Patented in Austria-Hungary January 30, 1891, No. 33,431 and No. 75,131.

*To all whom it may concern:*

Be it known that I, FRANZ FORCHER VON AINBACH, a subject of the Emperor of Austria-Hungary, residing at Knittelfeld, in the Province of Styria, in the Empire of Austria-Hungary, have invented certain new and useful Improvements in Composition for the Manufacture of Artificial Stone Used for Various Purposes, called Wolfram Cement, (patented in Austria-Hungary January 30, 1891, No. 33,431 and No. 75,131;) and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The wolfram cement consists according to its use essentially either of burnt dolomite as much as possible free of silicic acid containing carbonate of lime not more than twenty-seven per cent., or of burnt magnesite capable of efficiently resisting pressure and the weather, with the addition of wolfram or tungstic acid and a solution of chloride of magnesia.

To form my improved composition the paste obtained from this mass is mixed in the ordinary way by the addition of water, with clean sharp sand, marble sand, emery feldspar, glass, flint-stone, fragments of china, pebbles, &c., corresponding to the purpose for which the use of the artificial stone to be produced is intended. These substances in cooling off combine with the same most intimately and form a homogeneous mass which furnishes according to the kind of addition just as perfect and fine mill stones and grind stones, side walk plates, &c., as well as wonderfully sharp edged casts from molds, &c. Mixed with pure mineral colors this mass can be used for imitations of natural granite agate, marble, malachite, &c., having a really splendid aspect, as they admit of a grinding and polishing just like natural stone. Employed on stone plates for instance as the main relief for decorating, a combination with the base plate to one unseparable body is effected. The wolfram cement can be obtained either as quickly or as slowly binding, without losing its capability of hardening and it surpasses in durability and binding power all known magnesia-cements.

For greater convenience or cheapness as the case may be I produce the basic mass by the calcination of dolomite or magnesite. The production of this cement from dolomite is effected in the following manner:

(A) Pure dolomite containing at the utmost twenty-seven per cent. of carbonate of lime and being as free as possible from silicates is calcined in a furnace of any convenient construction for thirty-six to forty-eight hours. During this process the temperature should never be over 500° centigrade for the object of the same is to withdraw from the carbonate of magnesia nearly the whole amount of carbonic acid while the carbonate of lime should not be decomposed.

(B) From magnesia: The latter is calcined in the ordinary way in order to obtain the properties of cement. After cooling off, the product obtained by the processes described under A and B is brought upon mills to be finely ground and then it is preserved for use under exclusion of air. This powder or flour shows in itself of course all the qualities of a good cement. However these qualities are notably increased by the addition of chemicals as described below. The resulting composition constitutes my invention. The well known inconvenient liability of the magnesia cement, to decay under the influence of time and air must be remedied by special additions. I add flour to the cement after having moistened it with water, and divide evenly as far as possible one to fifteen per cent. of a solution of chloride of magnesia at 15° to 40° Baumé and one to forty per cent. of my wolframate (salts of wolfram acid) for instance that of soda.

The chemical changes effected by these mixtures are the following: The addition of water produces the formation of hydrate of magnesia which is not soluble in water. The chloride of magnesia changes a quantity of magnesia, corresponding to the amount of addition into a very hard crystalline double compound. The wolfram acid forms a part of many minerals. Its salts with alkaline earths and heavy metals are insoluble in water and form hard masses being amorphous in precipitated state. The process consists in treating the hydraulic mass beside the chloride of magnesia with a solution of a wolframate or salt of tungstic acid for instance of wolframate of soda whereby a chemical action takes place, forming complicated compounds of wolframates of the alkaline earths giving to the artificial stone an extraordinary hardness and resistance to weather and fire. As the above explanation shows it depends entirely upon the producer within what limits he may give to the product any desired degree of hardness as the latter is governed by the added amount of chloride of magnesia and wolfram acid. The flour of dolomite as described under A is unfit alone for fireproofing on account of the lime it contains. A further very great advantage of the wolfram cement composition is that the hardening occurs in taking up carbonic acid from the surrounding air. Thus the conditions destructive to all silicate cements act preservatively on my composition. Of the greatest practical value is further the property of the magnesia to form with ammonia a crystalline compound which is completely insoluble, so that my mass of cement gives the only means to prevent the decay of walls in stables, privies and sewers, for the great affinity of these two substances to each other prevents the ammonia in such places from becoming nitric acid which is the only cause of rot, but causes it to form with the magnesia a completely insoluble compound.

The production of artificial stone casts, fire proof linings, &c., is effected in the following way: The solid and liquid parts of the wolfram cement are mixed into a paste which should be of thicker or thinner consistency according to the kind and quantity of the further addition which may be of one-half to twenty parts in weight. The kind of such material to be added may vary greatly as already mentioned. It will depend for artificial stone casts entirely upon the color and structure of the natural stone to be imitated, while for other products for instance mill stones, plates for side walks, grind stones, &c., the composition has to be adapted to the purposes for which the use of the artificial product is intended. The wolfram cement paste and the additions are now most intimately mixed and are then cast into the necessary molds wherein they are exposed to pressure. For fire proof lining they are spread upon the bodies to be protected by means of brushes or by means of a trowel after the addition of fine quartz sand. The hardening is obtained according to mixture and temperature within three to four hours, whereupon the cast may be withdrawn from the mold to be ground and polished. The temperature of the place wherein these manipulations are made should not be under zero and not over 30° centigrade.

The proportions which have proved after many trials to be the best at present known for the respective purposes are the following in parts of weights:

For artificial stone to be used as building stone, decorations of architecture, &c.: five dolomite of magnesia burnt and in powder, five solution of chloride of magnesia, one solution of a tungstate salt, five fine sharp pure sand.

For grind stones: ten flour of burnt dolomite or magnesite, five solution of chloride of magnesia, four solution of a tungstate salt, fifteen to fifty emery and quartz, glass or fragments of china reduced to powder.

For mill stones: thirty flour of burnt dolomite or magnesite, fifteen solution of chloride of magnesia, ten solution of a tungstate salt, five hundred quartz, feldspar, pebbles, glass and granite in mixture and grain according to the purpose to which the use of the stone is destined.

For fire proof lining on wood, &c.: five flour of burnt dolomite or magnesite, three solution of chloride of magnesia, one solution of wolfram or tungstic acid, fifteen fine quartz sand.

For marble cast of statues, pavement plates, &c.: ten flour of burnt dolomite or magnesite, five to seven solution of chloride of magnesia, three solution of wolfram or tungstic acid, ten to four hundred marble sand.

It is self evident that little deviations from the above proportions as may be necessary in the manufacture on a large scale would produce no change in the expected results.

I have chosen the name of wolfram cement as the most important qualities of this cement are produced by the wolfram acid.

Having thus described my invention, what I desire to secure by Letters Patent is—

A composition consisting of powdered and burnt magnesite and an aqueous solution of tungstate of soda substantially as set forth.

In testimony whereof I affix my signature in presence of two witnesses.

FRANZ FORCHER VON AINBACH.

Witnesses:
W. B. MURPHY,
PAUL BERGER.